Oct. 27, 1964 T. E. BELSHAW 3,154,027
MANDREL FOR DOUGHNUT MACHINE
Filed Dec. 13, 1962
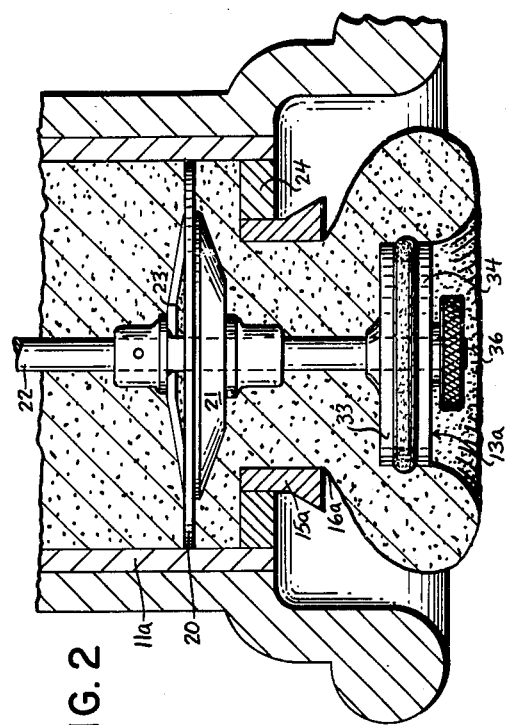
FIG. 2
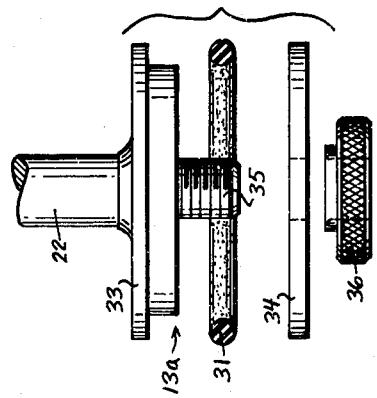
FIG. 6
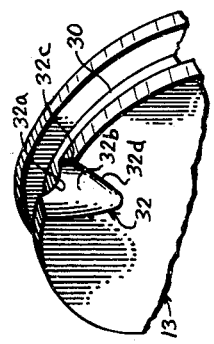
FIG. 5
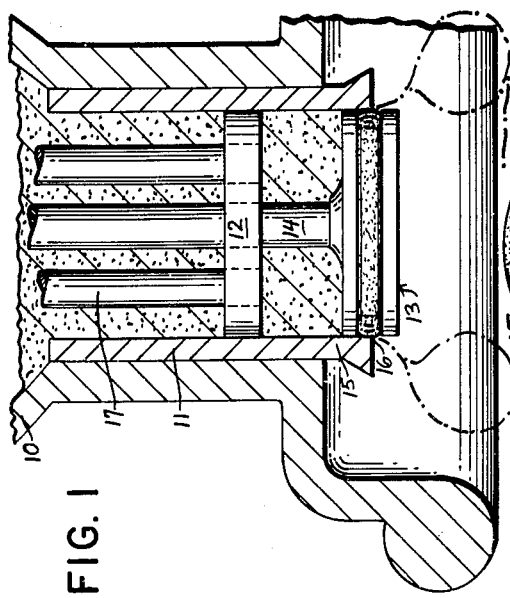
FIG. 1
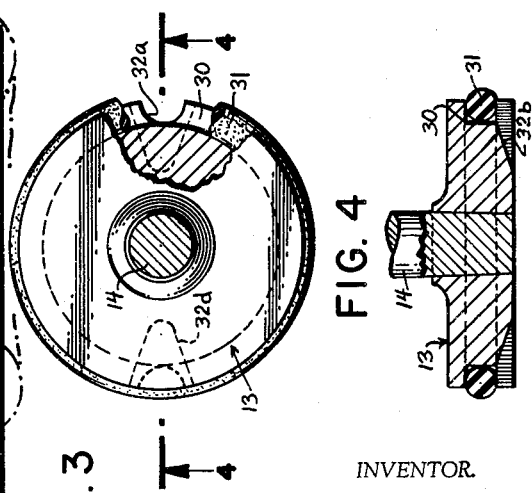
FIG. 3
FIG. 4
INVENTOR.
THOMAS E. BELSHAW
BY Seed & Berry
ATTORNEYS

United States Patent Office 3,154,027
Patented Oct. 27, 1964

3,154,027
MANDREL FOR DOUGHNUT MACHINE
Thomas E. Belshaw, 1772 22nd Ave. S., Seattle, Wash.
Filed Dec. 13, 1962, Ser. No. 244,505
4 Claims. (Cl. 107—14)

The present invention relates to an improved mandrel for dough-ring forming machines such for example as the doughnut machines disclosed in United States Patents Nos. 1,738,033 and 2,637,282.

In such doughnut machines a piston-like mandrel is moved up and down between an upper position within an outlet portion of a dough hopper and a lower dough-ring forming position wherein the mandrel is spaced beneath the hopper. Dough is extruded from the hopper as by a piston to flow over and around the mandrel so that as the mandrel is then moved upwardly into engagement with the rim of the hopper outlet, a dough ring is cut off.

The present invention aims to provide an improved mandrel of simple and economical construction which can be readily cleaned and which will effect a superior dough cut-off during its up-stroke and will more cleanly wipe the inside wall of the related outlet portion of the hopper.

The foregoing and other objects and advantages in view will appear and be understood in the following description and claims, the invention consisting in the novel construction and in the adaptation and combination of parts hereinafter described and claimed.

In the accompanying drawings:

FIG. 1 is a side elevational view, with parts of the hopper in vertical section, of a first embodiment of the present invention applied, for example, to a doughnut machine such as disclosed in Patent No. 1,738,033, and shown with the mandrel at dough-ring cutoff position.

FIG. 2 is a side elevational view, with parts of the hopper in vertical section, of a second embodiment of the invention applied, for example, to a doughnut machine such as disclosed in Patent No. 2,637,282, and shown with the mandrel at its lowermost position and with dough being extruded from the hopper.

FIG. 3 is a top plan view of the mandrel of the first embodiment partly broken away.

FIG. 4 is a vertical sectional view taken as indicated by the line 4—4 of FIG. 3.

FIG. 5 is a fragmentary perspective view illustrating the access slot at the underside of the first embodiment; and FIG. 6 is an exploded elevational view of the mandrel of the second embodiment.

Referring to the drawings, for purposes of example I have illustrated two embodiments of my invention, denoted 13 and 13a, applied to two different dough-ring forming devices, and namely those shown in Patents Nos. 1,738,033 and 2,637,282. However, it is to be understood that both embodiments can be used with either doughnut machine or with others of similar operation.

In the machine of the type shown in FIG. 1 the dough is fed from a hopper 10 into a depending cylinder 11 from which it is discharged by action of a plunger 12 which coacts with the forming piston or mandrel 13. The latter is press fitted on the lower end of a rod 14 which is reciprocated to move the mandrel to a lower forming position spaced beneath the cylinder 11, and then the plunger 12 rides along the rod 14 by action of a pair of reciprocating rods 17 to extrude dough from the cylinder between its lower end and the mandrel 13. On the return stroke of the rod 14 and rods 17 the mandrel coacts with the lower rim 16 of the cylinder to cut off the extruded dough ring, the cut-off point being illustrated in FIG. 1. At its upper limit of travel the mandrel fits within the lower outlet portion 15 of the hopper cylinder 11.

In the dough forming apparatus of the type shown in Patent No. 2,637,282, the role of the plunger 12 is assumed by check valve components 20—21. Component 20 and the mandrel 13a are fixed to a reciprocating rod 22 while the other component 21 is slidably mounted therebetween to close the valve openings 23 in the component 20 during the downstroke. After this closure the components 20—21 function as a plunger as the downstroke is completed to extrude dough from a modified cylinder 11a between the mandrel and the lower rim 16a of a reduced outlet portion 15a provided by a plug 24.

It has been the past practice with the mandrels for the dough forming machines of the types above described to provide the forming piston or mandrel with a circumferential groove. During operation of the machines this groove becomes filled with dough to help afford a close connection between the mandrel and the wall of the related discharge cylinder or outlet rim. However, when the dough rings are extruded into a fryer, the dough in the groove tends to harden from the heat of the fryer and loses its effectiveness as a seal. Furthermore, clean wiping of the wall of the discharge cylinder at the outlet or cutoff portion is not assured by the mandrel and the dough residue also tends to cake or harden, particularly if the machine is mounted on a fryer or remains idle at atmospheric temperature for quite a period of time. Such a residue retards operation of the machine and sometimes flakes into the dough rings being formed with the result that doughnut quality is adversely effected, even to such a degree that some of the end product may be objectionably inferior in shape, size or texture.

The mandrel 13 of the present invention has a circumscribing groove 30 into which is fitted an elastic O-ring 31 of neoprene or the like. In its relaxed state this O-ring has an inside diameter slightly less than that of the groove 30 so that the O-ring will be somewhat stretched over the mandrel when seated in the groove. It will be noted that the O-ring purposely protrudes radially from the groove when the mandrel is free of the hopper, and in fact then has an outside diameter slightly larger than the inside diameter of the outlet portion 15 of the hopper. However, this radial protrusion of the O-ring from the groove 30 is not sufficient to prevent the O-ring from being readily inwardly compressed by the wall of the outlet portion 15 during the upward stroke of the mandrel. In this regard, it will be noted that the cross-section of the groove 30 is rectangular as distinguished from the rounded cross-section of the O-ring, when relaxed. This provides relief portions at the corners of the groove which can be occupied by the O-ring when it is radially compressed.

As part of the present invention, the lower face of the mandrel is formed with one or more access slots 32 which intersect the groove 30. The actual intersection 32a when viewed from the underside is generally semi-circular and reaches the floor of the groove. The floor 32b of the slot then gradually narrows in width circumferentially of the mandrel and slopes downwardly and radially inward of the mandrel as it proceeds from the groove 30 to merge with the converging side walls of the slot at the lower face of the mandrel. From the ends of the semi-circular intersection 32a the slot's side walls diverge along lines 32c to the base of the mandrel from whence their bottom edges (the mouth of the slot) define a generally semi-elliptical line of intersection 32d with the bottom face of the mandrel. Thus the slot 32 is shaped and located such as to make it easy for the doughnut machine operator to insert a finger partially beneath the O-ring and thereby readily obtain a grip thereon. He can then stretch the O-ring to remove it from the mandrel preparatory to cleaning of doughnut machine.

In the modified mandrel 13a illustrated in FIG. 6 the floor and the upper side wall of the groove 30 for the O-ring are provided by an upper disc 33 which has the rim of its lower face circumferentially recessed. The lower side wall of the groove is formed by a flat disc 34 which has a center bore for fitting over a stud 35 depending as an integral prolongation of the upper disc 33. A retaining nut 36 having an enlarged knurled head is threaded onto the stud 35 to hold the discs 33—34 together. Thus to remove the O-ring for cleaning the operator need only unscrew the nut 36, and drop the lower disc 34 and O-ring free of the stud 35.

As before mentioned, either of the above described mandrels 13, 13a can be used with either of the doughnut machines of the types illustrated in FIGS. 1 and 2. In both instances, during the return upward stroke of the mandrel the O-ring 31 effects an unusually sharp and clean cut-off of the extruded dough ring with the related rim 16 or 16a of the outlet portion of the dough hopper. Furthermore, the O-ring keeps this rim and the related outlet portion 15 or 15a wiped clean of dough. As a result, a superior end product can be consistently obtained.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In combination, a dough hopper with a bottom cylindrical outlet portion, a piston-like mandrel operatively associated with said outlet portion for up and down movement between a lower dough-ring forming position wherein the mandrel is spaced below said outlet portion and an upper position wherein the mandrel nests within said outlet portion, means operatively associated with said hopper for extruding dough from said outlet portion over and around said mandrel while the mandrel is in its lower position, said mandrel having a circumscribing groove therein, and a removable elastic O-ring seated in said groove, said O-ring being radially expanded to an outside diameter exceeding the inside diameter of said outlet portion when the mandrel is in said lower position and being radially compressed within the confines of said outlet portion when the mandrel is in said upper position whereby said O-ring cooperates with the rim of said outlet portion during the up-stroke of the mandrel to cleanly cut off as a ring the dough extruded while the mandrel was in its said lower position and to wipe the inside of said outlet portion free of dough.

2. The structure of claim 1 in which said mandrel has an access slot in its bottom face which intersects said groove for insertion of a finger to manually grip said O-ring for easy removal thereof to expedite cleaning of the O-ring and groove.

3. The structure of claim 1 in which said groove is defined by upper and lower separable mandrel parts, and means for detachably holding said parts together.

4. The structure of claim 1 in which said groove is defined by upper and lower separable mandrel parts, said upper part presenting a depending threaded stud extending through said lower part, and a nut on said stud for detachably holding said parts together.

References Cited in the file of this patent

UNITED STATES PATENTS

| | | |
|---|---|---|
| 1,738,033 | Belshaw | Dec. 3, 1929 |
| 2,637,282 | Belshaw | May 15, 1953 |
| 2,882,838 | Gilmore | Apr. 21, 1959 |
| 3,042,194 | Gilmore | Sept. 4, 1962 |
| 3,052,196 | Gilmore | Sept. 4, 1962 |